March 31, 1931. M. A. SEAHOLM 1,798,439
MACHINE FOR FORMING CAN BODIES
Filed Aug. 1, 1927 9 Sheets-Sheet 1

INVENTOR
Martin August Seaholm
By Rector Hibben Davis Macauley
His ATTORNEYS

March 31, 1931 M. A. SEAHOLM 1,798,439
MACHINE FOR FORMING CAN BODIES
Filed Aug. 1, 1927 9 Sheets-Sheet 2

March 31, 1931.                M. A. SEAHOLM                 1,798,439
                        MACHINE FOR FORMING CAN BODIES
                        Filed Aug. 1, 1927          9 Sheets-Sheet 7

INVENTOR
Martin August Seaholm
By Rector, Hibben, Davis Macauley
his ATTORNEYS March 31, 1931.  M. A. SEAHOLM  1,798,439
MACHINE FOR FORMING CAN BODIES
Filed Aug. 1, 1927  9 Sheets-Sheet 9

Patented Mar. 31, 1931

1,798,439

UNITED STATES PATENT OFFICE

MARTIN AUGUST SEAHOLM, OF CHICAGO, ILLINOIS

MACHINE FOR FORMING CAN BODIES

Application filed August 1, 1927. Serial No. 209,895.

My invention relates to improvements in a machine for rolling and seaming sheet metal blanks having parallel edges to form cylinders having a closed interlocked seam running longitudinally of the cylinder. The machine which is illustrated in the accompanying drawings and is hereinafter more particularly described was devised for the purpose of forming can bodies—that is, the cylindrical members of complete tin or other sheet metal cans such as are largely used in many industries,—to which bottom and top members are afterward applied, and my present invention relates only to a machine for the formation of the can bodies.

As can bodies are now usually made by machines with which I am familiar, the blanks are fed centrally above a cylindrical horn and each successive blank either first bent to a trough shape by a U-shaped former and the edges then turned in around the horn, or a pair of oscillating curved wings of large sweep are employed to swing downwardly around the horn in opposite directions and bend the blank into cylindrical form. In either case the tin, or other sheet metal, in bending naturally yields most readily at its weakest spots or on its weakest lines, and the result is in most cases a can body whose surface presents a series of "flats" and blunt ridges, or other irregularities. In general the object of my invention is to provide a machine which by employing a winding or rolling cylinder shall operate to produce a can body of smooth and even surface and more nearly of a true cylindrical form than any heretofore known and which shall be suitable for the commercial manufacture of such bodies of a uniform and accurate size rapidly and on a large scale. In carrying out my invention, I have had in mind various improvements and advantages desirable in such a machine which it is the object of my invention to attain by novel features of construction and arrangement of the cooperating mechanisms and combinations of elements which constitute the machine.

One object of my invention relates to the provision of a novel mechanism for cutting or clipping the corners of the metal sheets at one stage of operation of the machine preparatory to forming certain types of can bodies; another object relates to a new and improved mechanism for clamping the sheets and bending the edges thereof at a further stage previous to the winding and rolling operation; another object relates to a novel positively-acting mechanism for winding or rolling the sheets into circular form; another object relates to mechanism for interlocking the bent edges of the sheets and pressing them tightly together to form the locked seam of the bodies; and another arrangement and adjustment of the parts of the machine whereby it may readily be set to produce various sizes of can bodies within its predetermined limits of adjustment.

Incidental to the foregoing features, I have devised various novel and original details of construction and arrangement of particular parts and members of the machine which will be apparent from the detailed description hereinafter given. In the appended claims, I have particularly pointed out the essential elements of my invention, it being understood, however, that my invention is capable of being employed in various forms, by the substitution of equivalent elements for those shown and described, changes in the form and proportions of parts and like modifications which may be made without departure from the spirit of my invention, and I therefore do not limit my claims further than is required by the existing state of the art.

In the accompanying drawings.

The same reference characters indicate the same parts in all the figures of the drawings.

First describing briefly the general organization and arrangement of parts of the machine, it may be explained that from a stack of cut sheet metal blanks placed in a magazine at the front or feed end of the machine, the blanks are separated from the bottom of the stack one by one by means of a pneumatic vacuum device and carried rearwardly by reciprocating feeder bars to successive work stations. At the first station, the corners of the blank are, or may be, clipped,— this operation not being necessary in producing certain forms of can bodies;—then, at the next station, the opposite edges of the blank are bent sharply at acute angles, the bend on one side, in the present instance the left, extending upwardly and on the other side extending downwardly; at the next station the blanks are wound into approximately cylindrical form by means of an intermittently-rotating cylinder equipped with an engaging blade which hooks under the upwardly extending bend of the blank, and the partially formed shell is then shifted by a second shifting mechanism arranged above it onto a horn at the last work station provided with intermittently-actuated expander segments which operate to spread the blank accurately to cylindrical form, with the bent edges hooked together, whereupon a pressure hammer closes the seam, and upon retraction of the expander segments the formed can bodies are finally discharged at the rear end of the machine.

It may here be explained that a single pair of reciprocating feeding bars equipped with dog members serves to transfer the sheets from the magazine successively to the corner-notching mechanism, the edge-bending mechanism, and the body-rolling mechanism, and that such stations are two feed strokes apart; while the transfer from the rolling mechanism to the seam-closing mechanism and the discharge movement are effected by successive strokes of the second and upper pair of reciprocating feeder bars.

Figure 1:
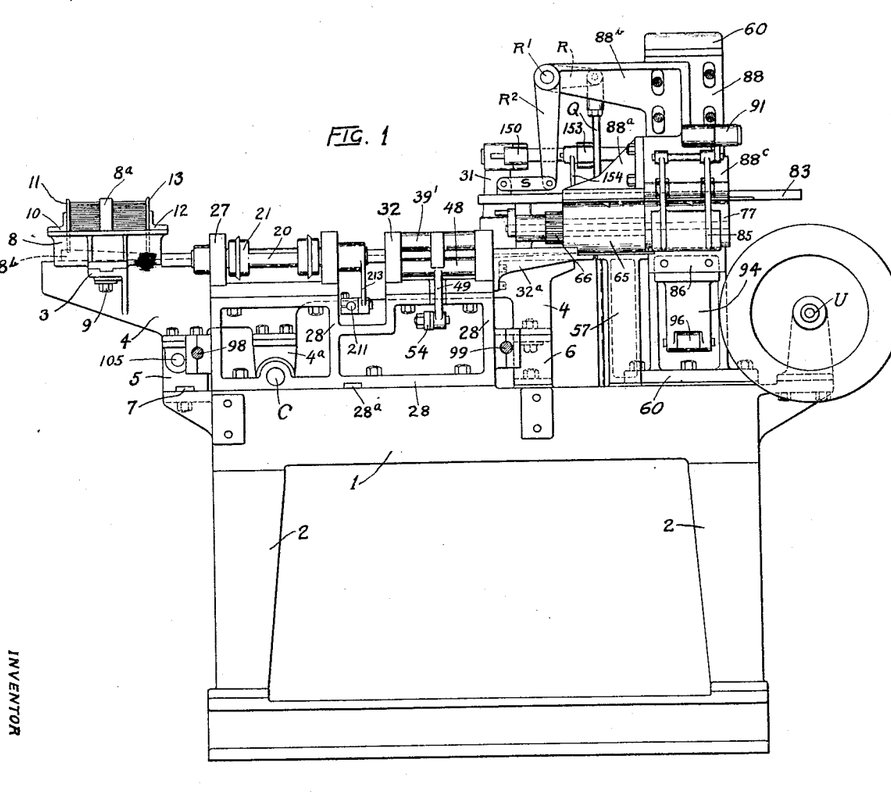
Figure 1 is an elevation of the right side of the machine, the feed end of the machine (at the left in said figure) being regarded as the front end.

Proceeding now to a detailed description of the machine as illustrated, the bed plate 1 of the machine, supported upon leg castings 2, is suitably constructed and machined to support the frame brackets and members which carry the movable working parts. At the front end of the machine, the metal sheet magazine is supported upon opposite laterally extending front sections 3—3 of a laterally adjustable feeder bar support 4 which adjacent its front end is bolted to a block 5 and at its rear end is supported by and slidingly adjustable upon a box 6 bolted to the bed plate of the machine,—see Figs. 1, 3 and 12. The block 5 engages a cross guide rail 7 secured to the bed plate to prevent longitudinal displacement of the support during adjustment of such block and feeder bar.

Figures 11, 12:
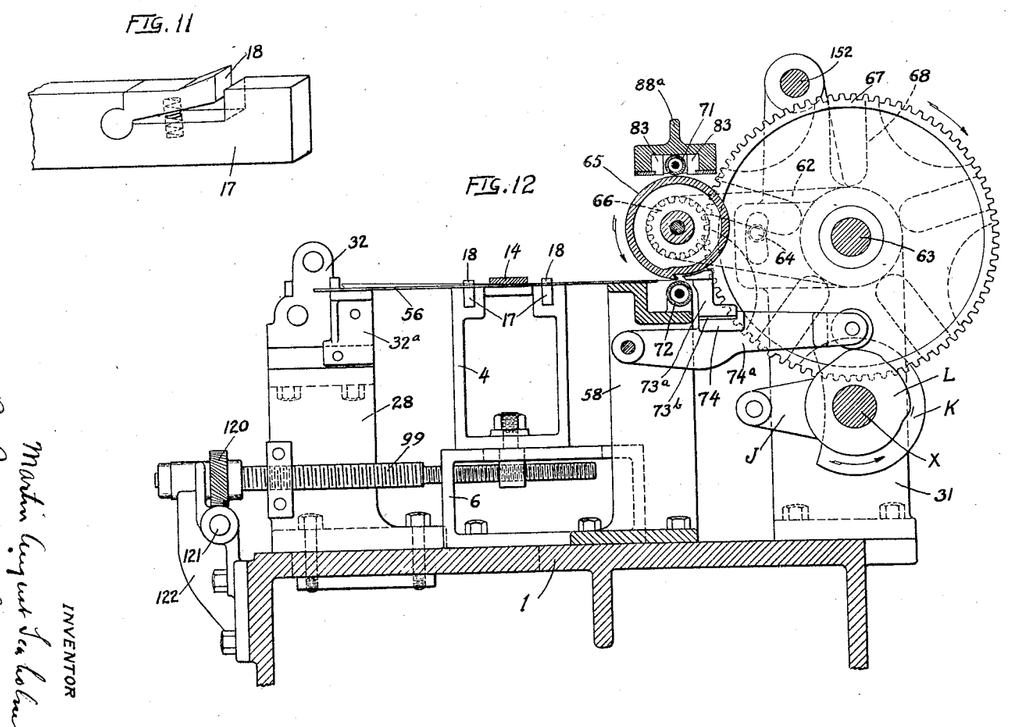
Fig. 11 is a perspective of one of the feeder pawls carried by the reciprocating feeder bars, shown in position in a portion of one of said bars.
Fig. 12 is a vertical transverse section in a plane indicated by the dotted line 12—12 of Fig. 3, looking in the direction of the arrow, the cam and connections for operating the horn-expanding rod being omitted.

Seated in grooves extending longitudinally of the feeder bar support are the reciprocating feeder bars 17, equipped with feed dogs which operate to advance the blanks in successive steps from front to rear. The front pair of feed dogs are in the present instance fixed in position in the bars and are formed with a hooked or overhanging front edge. The dogs to the rear of the front pair, marked 18, are oscillating spring-pressed dogs, and for convenience in manufacture and assembly may be constructed as shown in Fig. 11, the rear of a dog stopping against the back wall of its seat and the dogs being of the same width as the feeder bars.

Figure 22:
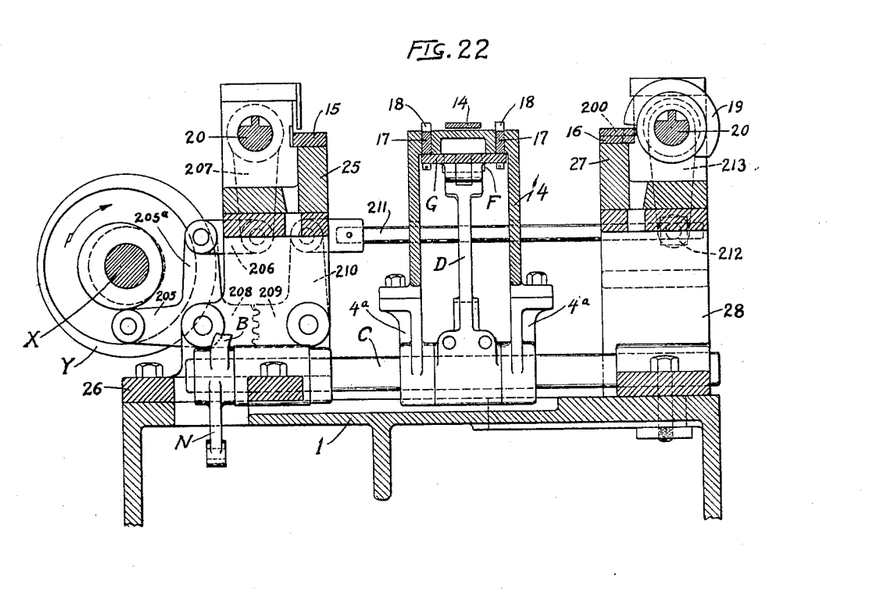
Fig. 22 is a vertical transverse section through the machine in broken planes indicated by the dotted line 22—22 of Fig. 3, looking in the direction of the arrow.
Figure 23:
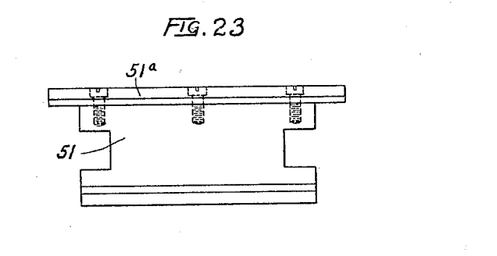
Fig. 23 is a detail side view of a bending bar or plate forming part of the right side bending mechanism, detached.
Figure 24:
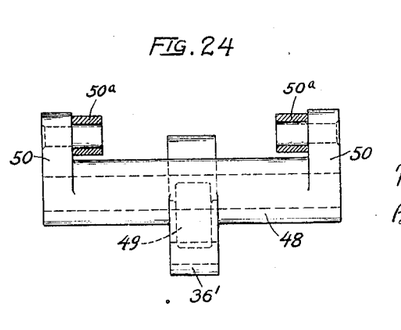
Fig. 24 is a detail top view of an oscillating hub and rock arms with associated pivot blocks for actuating said bending bar, detached from other parts.

The feeder bars are reciprocated through a cam A fixed to a main cam shaft X which extends longitudinally along the left side of the machine and is rotatably mounted in stationary frame brackets hereinafter described in detail. This cam A is formed with a peripheral groove engaged by a cam roller carried by a rock arm B (see Figs. 2 and 22), fixed to a cross shaft C pivoted in a stationary frame bracket 26 and a movable bracket 28, both of which will again be referred to. This shaft C near its center is equipped with a rock arm D arranged to clamp thereon by screws which may be loosened and tightened for purposes of adjustment. This rock arm is connected by a link E with a pivot rod F which extends transversely of the two feeder bars and is pivoted between a pair of pivot lugs formed on the rear end of a plate G which is secured to the underside of both bars and works in a recess on the underside of the feeder bar support,—see Figs. 2, 3 and 22.

To strengthen the pivotal support of the shaft C, and also to provide for a smooth shifting movement of the hub of the arm D when adjusting it upon the shaft C, the feeder bar support 4 is provided with a yoke consisting of a pair of bearing blocks 4ª—4ª bolted to said support and rotatably engaging said shaft, said bearing blocks being formed with inner side faces bearing against the opposite side faces of the hub.

Sheet magazine

Upon the hereinbefore mentioned sections 3—3 of the feeder bar support are secured opposite base plates 8—8, extending longitudinally of the machine and secured to said sections by bolts 9—9 engaging slots in the members 3. The plates 8 are severally equipped with guide posts 8ª—8ª, and also with supporting bars 8ᵇ, the tops of which rise to the plane of the stack of blanks and form supports for the opposite side edges thereof. To the front end of said base plates are severally secured transverse angle blocks 10—10 adjustably secured in a similar manner to said plates, the blocks being equipped with guide posts 11—11 for positioning the front edges of the stack, and at the rear ends of the base plates is secured an angle bar strip 12 equipped with a central guide post 13, the strip being secured to the base plates by bolts engaging elongated slots permitting adjustment both longitudinally and transversely of the machine. The supporting bars 8ᵇ slope slightly downwardly towards the rear so that the blanks (when successively detached from the bottom of the stack in a manner to be later described) will be delivered under the front end of a central top guide bar 14 which extends longitudinally on top of the feeder bar support 4, and between a stationary side guide bar 15 which guides the sheets along the left side of the machine and an opposite guide bar 16 which is laterally adjustable with other mechanism of the machine.

Figure 2:
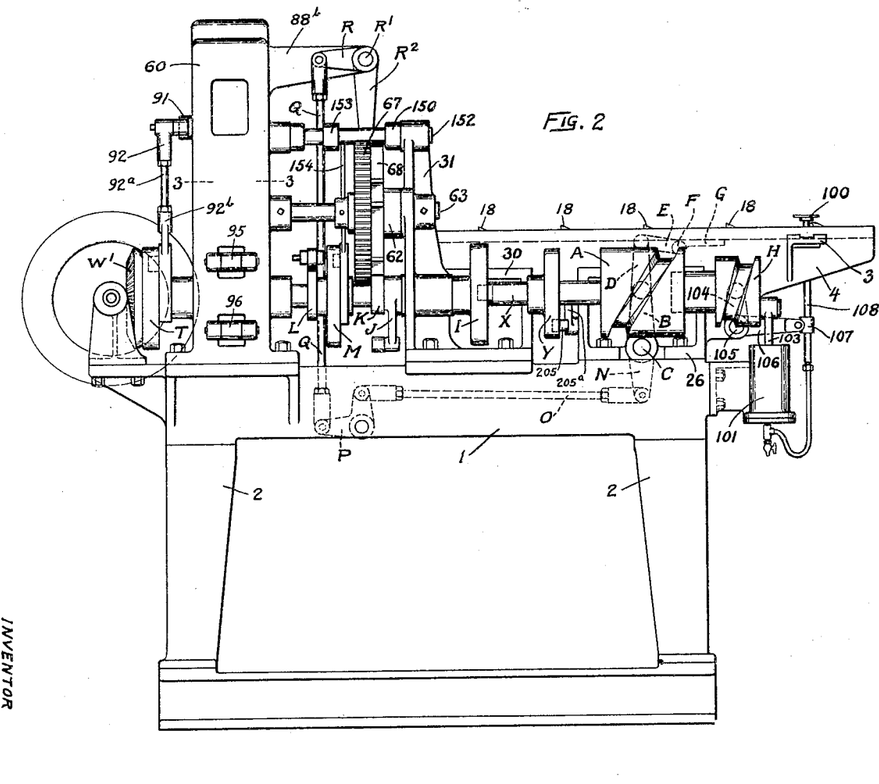
Fig. 2 is an elevation of the left side of the machine, the metal blank magazine and the corner-clipping and edge bending mechanisms being omitted.
Figure 3:
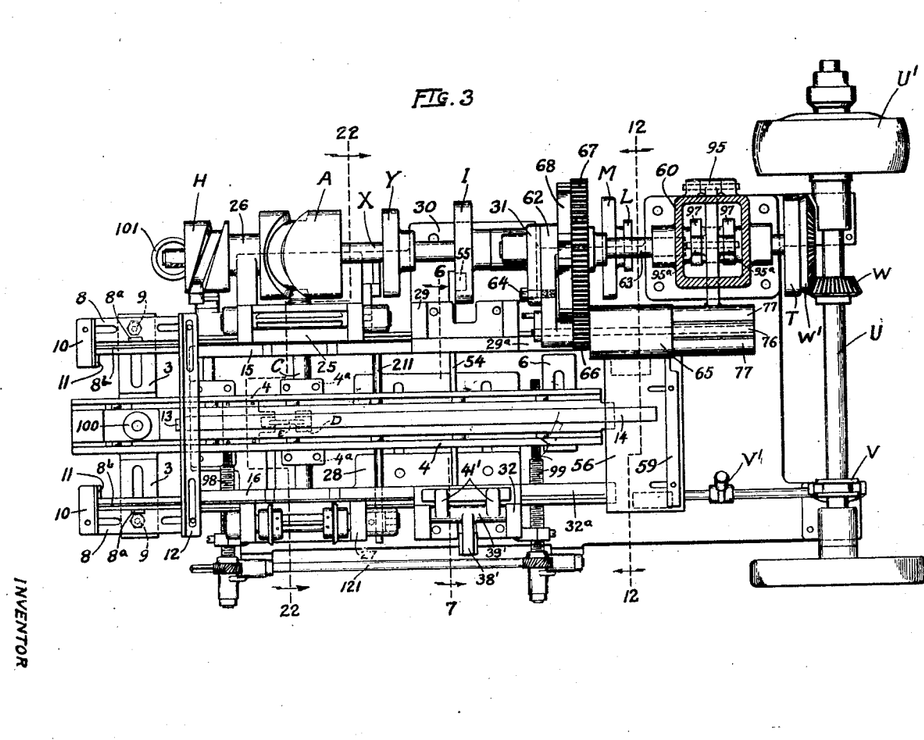
Fig. 3 is a plan view, parts above the plane of the dotted line 3—3 of Fig. 2 not being illustrated and the cutters of the corner clipping mechanism and the left side edge bending mechanism not being shown.

As shown in Figs. 2 and 3, a vacuum cup 100 of rubber or other suitable material, mounted for vertical reciprocating movement in the front end of the feeder support and connected with a vacuum pump 101, is employed to separate the lowermost blank from a stack of blanks in the magazine and intermittently thus draw successive blanks downwardly into the path of the pair of hooked dogs upon the front end of the feeder bars. The pump is operated by a crank pin 102 carried by a cam H, which crank pin is pivoted to the rocking connecting rod 103 of the pump piston, and the vacuum cup 100 is raised and lowered at the proper time by means of a side groove in the cam H engaged by a cam roller on the end of a rock arm 104 fast to a rock shaft 105 journaled in the frame bracket 26, which shaft carries a rock arm 106 loosely pivoted to a collar 107 fast to the hollow stem 108 of the vacuum cup member.

Corner clipping mechanism

Rearwardly of the magazine I have provided mechanism for clipping the corners of the blanks, in order that the seam of the rolled can bodies may terminate short of the ends of the cylinders and leave only a single thickness of the sheet metal between the ends of the folded seam and the ends of the cylinder, this being necessary to permit the ends of the can to be applied, in the case of certain kinds of cans. This mechanism may be disconnected if it is desired that the seam shall extend the full length of the body.

Figure 8:
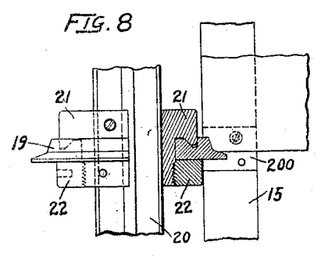
Fig. 8 is a detail top view, partly in horizontal section, of one of the corner-clipping devices, with a blank shown in position to be clipped.
Figure 9:
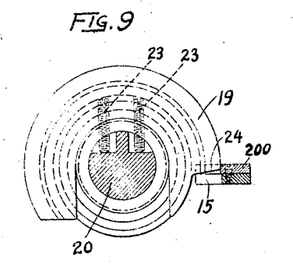
Fig. 9 is an elevation of the same, viewed axially of the actuating shaft, the shaft being shown in section.

This corner clipping mechanism consists of one or two pairs of opposite, suitably shaped oscillating cutters (see Figs. 1, 3, 8 and 9), the cutter members, one of which is illustrated in detail in Figs. 8 and 9, not being shown in the left side cutter mechanism in Fig. 3. The blade 19 of each cutter, as shown, is formed with a semi-cylindrical inner face or surface adapted to engage a cylindrical face formed on a sleeve 21 which is adjustably secured to an oscillating cutter shaft 20, and is also formed with a groove having a coned face arranged to engage the correspondingly coned surface of a flange arranged to seat in said groove. Clearance is provided at opposite ends of the coned faces so that the blade can be accurately centered and clamped securely to the sleeve by means of a clamping nut 22 having threaded engagement with the hub of the sleeve. The blade is cut away tangentially from its cylindrical inner face so that when the nut 22 is unscrewed and the blade shifted axially of the sleeve to avoid interference the blade may readily be removed laterally or radially of the sleeve for sharpening or replacement.

It may here be explained that while oscillating corner-clipping cutters are well-known in the art, they have heretofore always been made removable by sliding them lengthwise entirely off their shafts, and the inconvenience of removal in this manner has constituted a serious objection to their use.

The sleeve 21 is secured to the cutter shaft 20 in a manner permitting axial adjustment and also a limited degree of angular adjustment by means of a pair of screws 23—23 acting against the lower faces of two right-angled grooves cut in the upper face of said shaft.

Immediately below each cutter is arranged a shear block 200 having a shearing edge which is the counterpart of that of the cutter blade, each pair of blocks on one side of the machine being secured to the guide rail at that side, (either 15 or 16,) so that interchangeable guide rails may be used to provide for operation upon blanks of different dimensions.

It will be understood that the designs of can bodies vary, and that in some cases it is desired that the corners be clipped at one end of the seam only. The contour of the cut may also vary, and interchangeable as well as removable cutter blades and corresponding shear blocks are therefore necessary to adapt the machine for different forms of can bodies. All of these requirements are effectively supplied by the construction just described.

The cutter shaft of the left-hand cutter is rotatably mounted in a stationary cutter frame 25 secured to a frame bracket 26 bolted to the bed 1 at the left side of the machine, while the cutter shaft of the right-hand cutter is mounted in a similar cutter frame 27 bolted to the movable bracket 28 heretofore referred to which is adjustable transversely of the machine and also supports other parts later to be described. This bracket slidably engages a transversely disposed guide rail 28ª to prevent longitudinal displacement of the bracket and parts carried thereby while it is being adjusted.

The two pairs of cutters are both operated through a cam Y secured to the cam shaft X and formed with a side cam groove cooperating with a roller carried by a bell crank lever 205 journaled on a stud secured to the frame bracket 26, see Figs. 1, 2, 3 and 22.

The vertical arm 205ª of this lever is connected by a link 206 with an actuating arm 207 fixed to the shaft 20 upon which the left side pair of cutters are mounted.

The bell-crank lever 205 is formed with an inwardly facing segmental gear plate 208 arranged to cooperate with a second segmental gear 209 integral with a vertical rock arm 210 which is pivoted at its upper end to a connecting rod 211 which is adjustably connected by means of a pivot block 212 with a rock arm 213 secured to the shaft upon which the right-hand pair of cutters are mounted.

It is obvious that by the connections described the pairs of cutters will be oscillated simultaneously, but in opposite directions. The construction and arrangement of the parts is such that when the cutter shafts are oscillated the cutting edges of the four cutters, which initially stand at rest with such edges immediately above the four corners of the blank, will be rocked downwardly, the pair on one side rotating in a direction opposite that of the other pair, to shear off the corners, after which the parts return to their original position, ready to operate in a similar manner on the succeeding blank.

Edge-bending mechanism

Like the corner-clipping mechanism, the edge-bending mechanism consists of a stationarily mounted mechanism at the left side of the machine, and a transversely adjustable mechanism carried by the movable bracket 28 at the right side of the machine. The edge-bender frame 29 on the left side of the machine is secured to a forward extension 30 of a frame bracket 31 which is bolted to the bed plate 1 and also supports other parts of the machine. The right edge-bender frame 32 is bolted to the top of the movable bracket 28 before mentioned.

Referring to Figs. 1, 3, 6 and 7, which best illustrate the construction of the edge bender mechanism, the frame 29 at the left side of the machine is arranged to support a shaft 33 which is mounted in its end walls and upon which is pivoted a hub 34 to which is fixed an actuating arm 35 and also a rock arm 36. This rock arm is connected by a pair of links 37 to an arm 38 forming part of a rocking frame having a hub 39 rotatably mounted upon a pivot rod 40 supported by the end walls of the frame. Through a pair of arms 41—41, this frame carries an upper clamping bar 42 arranged to cooperate with a lower clamping bar 43 mounted in the frame, the bar 42 also serving as an anvil during the bending operation.

The hub 34 above mentioned is formed also with a pair of rock arms, marked 44—44, extending towards the center line of the machine, these arms being pivotally connected with a spring-pressed bending bar or tool 45 which is formed with a cam surface arranged to cooperate with a cam bar 46 in such manner that as the bar 45 is lifted it will be cammed inwardly at its top free edge. The bar or tool 45 is formed with a bending edge 45$^a$ which as the tool is lifted and forced inwardly acts to bend the edge of the blank at the time clamped between the bars 42 and 43 at an acute angle upwardly and inwardly with respect to the body of the blank.

The mechanism on the right side of the machine for bending the opposite edge downwardly is similar to that just described, though not an exact counterpart. This mechanism, which is carried by the frame 32 before mentioned, includes a shaft 47 mounted in the end walls of the frame, upon which shaft is pivotally supported a hub 48 formed with a downwardly extending actuating arm 49 and a rock arm 36′ which is connected by a pair of links 37′ to an arm 38′ forming part of a rocking frame 39′, this frame carrying through arms 41′—41′ an upper clamping bar 42′ arranged to cooperate with a lower clamping and edge-forming bar or anvil 43′; the parts mentioned corresponding generally to the similarly numbered elements of the opposite edge-bending mechanism.

The hub 48 is also formed with a pair of inwardly extending rock arms 50—50 at its opposite ends. Pivotally mounted in these arms and extended inwardly towards each other are a pair of square blocks 50$^a$ which severally engage square notches or seats formed in the opposite ends of a bending bar 51 to the top of which is secured a bending tool 51$^a$ which in effect forms a part of the bending bar. This bending bar is formed adjacent the top and bottom of its outer side with cam surfaces arranged to cooperate with an upper cam bar 52 and a lower cam bar 53 in such manner as to force the bending bar inwardly as it is forced downwardly. The bending tool is formed with a working edge which acts upon the right edge of a blank clamped between the bars to bend it downwardly and inwardly at an acute angle as the bending bar moves downwardly and inwardly.

It may here be explained that the toggle connections formed by the arms 36 and 36′ and the links 37 and 37′ respectively are such that the clamping members will stand normally in release position, and pass dead center at the time the stress of bending the edges of the blank is greatest, after which they will pass slightly beyond dead center position without releasing the blank, and then return to initial position to free the blank, the elasticity of the arms 38 and 38′ being sufficient to permit a clamping action to continue during the period of time required.

Rearwardly of the guide bars 15 and 16 the bender bars 45 and 51 serve as side guides for the edges of the blanks, such blanks being fed between the inner vertical faces of the bars, at intervals between their bending movements, in close proximity to their bending edges.

The actuating arms 35 and 49 are both simultaneously operated at proper intervals by a reciprocating cross bar 54, to the left end of which is pivoted a cam roller 55 engaging a cam groove formed in the side face of a cam disk I which is fixed to the main cam shaft X of the machine.

At the feeding stroke of the feeder bars which follows completion of the operation of bending the edges of a blank at the station of the edge-bending mechanism, such blank is fed rearwardly onto the top of a table 56 supported by boxes 57 and 58 secured to the bed plate of the machine, where it brings up against a stop rail 59, in position to be operated upon by the rolling mechanism. During this movement the blank is supported centrally by the feed bar support and adjacent its bent edges by a horizontal face formed on a portion 29$^a$ of the left edge bender frame 29 and an inclined face on a rearwardly extending bracket piece 32$^a$ bolted to the right edge-bender frame 32, guide flanges being provided at the edges of the blank (see Figs. 3, 12 and 13). At the end of its movement, the downwardly bent edge of the blank at the right side of the table will lie on top of the table,—to which it has been lifted by the inclined face on the bracket piece 32$^a$,—while the upwardly bent edge at the left will be immediately behind and in the path of movement of a hooked edge upon the rolling or winding cylinder shortly to be described, and above the lower one of a pair of guide rollers.

*Rolling mechanism.*—The mechanisms which constitute the rolling and seam-closing mechanisms of the machine are supported by the frame bracket 31 before mentioned and a second frame bracket 60, both of which are formed with journal bearings in which the cam shaft X is mounted (see Figs. 2 and 3). It is to be noted that the blanks acted upon by the corner-clipping and edge-bending mechanism, whatever their dimensions may be, are delivered upon the table 56 with the upwardly bent edge at the left side of the machine in the same position or line. Above this line, and with its axis in substantially the same vertical plane, is arranged a tubular core 61 (carrying at its rear end an integral section of an expanding horn, later to be described), which core is rigidly secured to a horizontal arm 62 (see Figs. 3 and 12). This arm, for the purpose of adjustment, is pivoted upon a shaft 63, which is fixed at its opposite ends in the brackets 31 and 60. The arm 62 is arranged to be clamped to the frame in any desired position of angular adjustment within a limited range by means of a clamping screw 64. Since the arc of adjustment is relatively small, angular adjustment of the arm will result in vertical adjustment of the core without material deviation from an exact vertical position above the bent edge of the blank upon the table below it.

Upon the core 61 is rotatably mounted a winding cylinder 65 which at its rear end is journaled upon the core and at its front end is keyed to the hub of a pinion 66 which is also journaled on the core and is given intermittent movement by a large gear 67 actuated by a Geneva wheel 68 fixed to its forward side, the connected gear 67 and Geneva wheel being pivoted on the shaft 63 before mentioned. The Geneva wheel is actuated by a roller on a crank arm J and blocked by an arcuate stop K to control its movement, both fixed to the main cam shaft X of the machine.

The winding cylinder 65 is formed with a cylindrical surface $a$ extending somewhat more than a semi-circumference and in the present instance extending through an arc of about 225°. The cylindrical surface merges into an inwardly curving involute surface $b$ which at its inner end terminates at the hook $c$ between the cylindrical and involute surfaces, the circumferential dimensions of the cylindrical and involute surfaces together slightly exceeding the length of the blank between its folded edges. In the present instance, for convenience of manufacture, the hooked end of the cylindrical surface is formed by a hook bar 65$^a$ secured to the cylinder though it may of course be formed integral with the cylinder. In a vertical plane passing axially through the cylinder are arranged an upper idler guide roller 71 and a lower guide roller 72, the latter being journaled in bearing lugs carried by the frame box 58 (see Fig. 12) and the former being mounted in bearings in an angular plate 88$^a$ (see Fig. 13) secured to and forming part of a vertically adjustable bracket 88 which is arranged to be secured to the frame bracket 60 in any desired position of adjustment (see Figs. 1 and 4), by means of clamping bolts extending through slotted orifices in said bracket.

Figure 14:
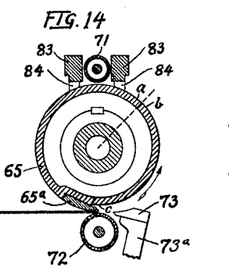
Figs. 14 to 18, inclusive, are cross sectional detail views of the forming cylinder and associated parts, in a plane indicated by the dotted line 14—14 of Fig. 13 showing successive positions of the parts during the winding of a blank.
Figure 15:
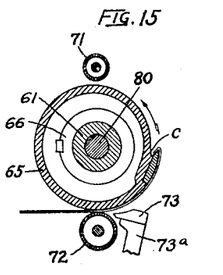
Figure 16:
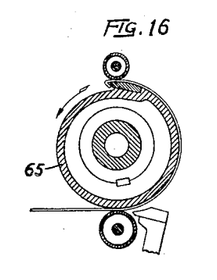
Figure 17:
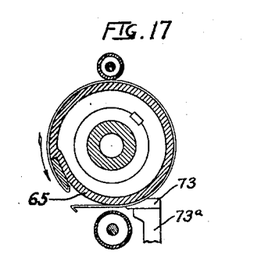

It will be understood that at each revolution of the cam shaft X, the Geneva wheel is moved one step and the cylinder 65 given one complete revolution, rotating in the direction indicated by arrows from the position of rest shown in Fig. 14 (and also Fig. 18) through the successive positions shown in Figs. 15, 16 and 17. It may be noted that in all positions of the cylinder one or both of the guide rollers will be in contact with a blank being rolled upon the cylinder.

To bring the final portion of the blank up to the involute surface of the winding cylinder as the blank is being rolled, I provide a follower bar 73 which stands slightly away from the cylindrical surface of the cylinder until the involute surface is reached and which then approaches the cylinder radially and follows the involute surface until just before the outwardly bent hook reaches it, at which time the rotation of the cylinder ceases and the follower bar is very slightly retracted and stands in this position during the first part of the stripping operation later to be described, the follower bar and hooking bar 65$^a$ then acting as guides to maintain the angular position of the wound blank while it is being shifted axially to the seam closing mechanism.

The follower bar (see Fig. 12) is secured to a block 73$^a$ which is screwed upon an interposed cushioning fabric strip 73$^b$ to block 74 integral with a rocking arm 74$^a$ which is pivoted to the frame box 58 at its front and rear sides, said arm being equipped with a cam roller cooperating with a cam L upon the cam shaft X, the cam being formed to impart to the follower bar the movements above described.

Figure 13:
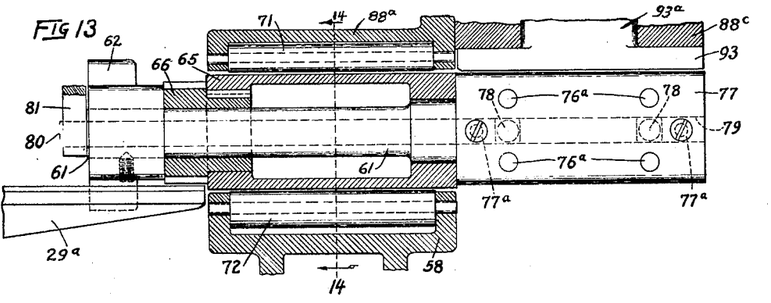
Fig. 13 is a side detail view, partly in vertical section, showing the forming cylinder and cooperating guide rolls and the expanding horn.
Figure 20:
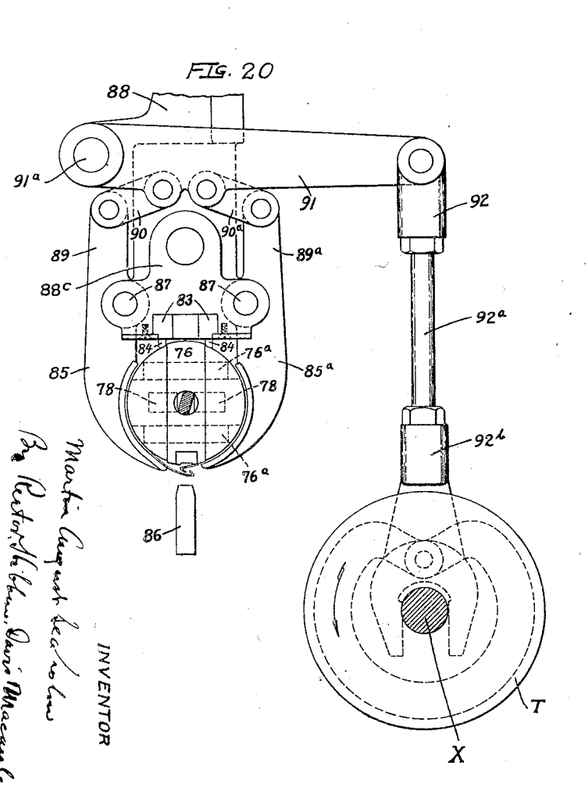
Fig. 20 is an end view of the expanding horn and hooking wings, with the connections for expanding the wings, the latter being shown in closed position.

*Seam closing mechanism.*—The tubular core 61 before mentioned is secured to or formed integral with the central or stationary portion 76 of an expanding horn having laterally movable side segments 77—77, each of which is supported and guided by the ends of an upper pair and a lower pair of guide pins 76$^a$ extending through the central section 76, the position of which is shown in Figs. 13 and 20. The segments 77 are each equipped with a pair of pins or plugs 78 fastened to the particular segment and working in cylindrical orifices extending outwardly from a central bore 79 in the member 76. The segments 77 are stressed inwardly toward the member 76 by means of springs 77$^a$ arranged within spring chambers near the opposite ends of the segments and severally confined between the bottom of the chamber and the head of a screw extending through the bottom of the chamber and seated in the member 76.

Figure 10:
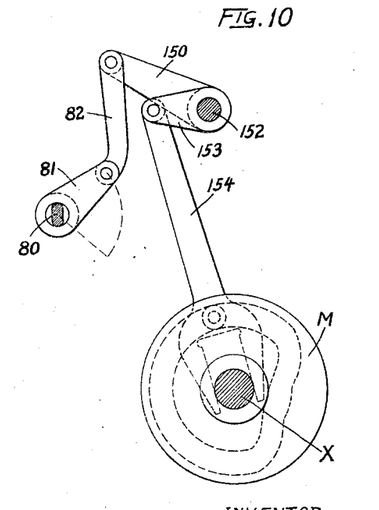
Fig. 10 is a view of the connections for actuating the horn-expanding rod of the machine, shown detached from other parts.

The bore 79 in the member 76 extends axially entirely through the core 61 upon which the winding cylinder is mounted, and is arranged to receive an expander rod 80 which, opposite the plugs 78, is formed with opposite flat faces arranged to act as cams to expand the segments 77—77 when the rod is oscillated. This oscillation is effected (see Figs. 2 and 10) through a crank arm 81 which is fixed to the rod 80 and connected by a link 82 with an arm 150 fixed to a rocking shaft 152 which is journaled in bearing bosses formed severally on the frame brackets 31 and 60 and which carries a second arm 153, this last-mentioned arm being pivoted to a rod 154 carrying at its lower end a cam yoke arranged to straddle the cam shaft X and equipped with a roller arranged to engage the side groove of a cam disk M secured to said shaft.

It may be explained here that the rolled blank is transferred from the winding cylinder to the expanding horn by a pair of horizontally arranged reciprocating upper or auxiliary feed bars 83, one on each side of the upper guide roller 71, equipped with downwardly extending spring-pressed feed dogs 84 which engage the wound blanks at proper intervals and shift them successively from the cylinder to the horn. These feed bars are mounted in slideways formed in the vertically adjustable frame members 88 and 88$^a$, and are actuated from the cam A which operates the lower feed bars hereinbefore described. To this end (see Figs. 1 and 2) the cross shaft C is provided adjacent the left side of the machine, with a depending arm N which by a rod O is arranged to rock a bell crank lever P and thereby reciprocate a vertical rod Q, the upper end of which rod is connected to a horizontal arm R fixed to a shaft R' which is pivotally mounted in a forwardly extending arm 88$^b$ of the vertically adjustable bracket 88 before mentioned. To this shaft R' is fixed a vertical arm R$^2$, the lower end of which is connected by a link S to said feed bars.

Figure 18:
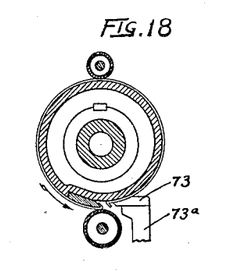
Figure 19:
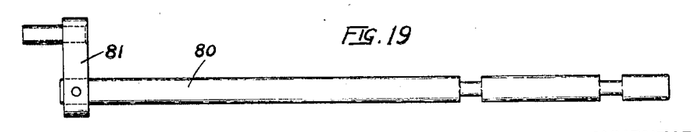
Fig. 19 is a view of the expander rod for actuating the side sections of the expanding horn.
Figure 21:
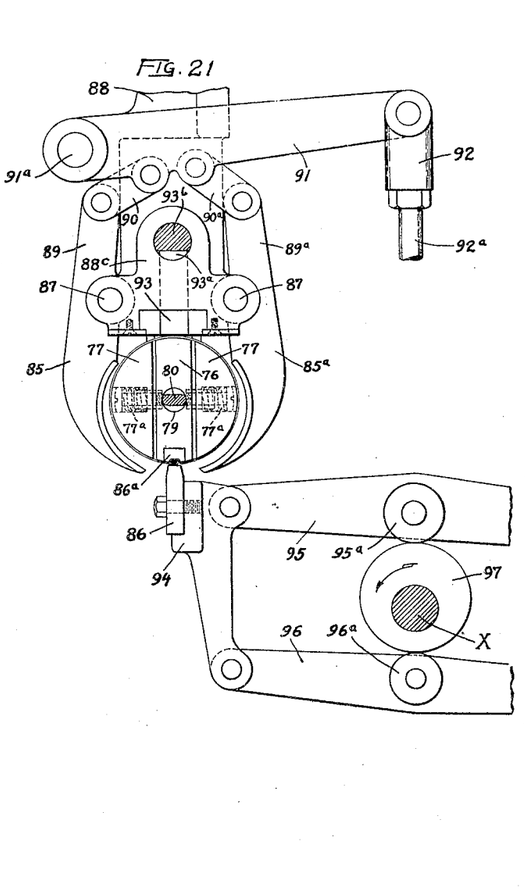
Fig. 21 is an end view of said horn and wings in open position, the hammer for closing the seam being shown at the upper end of its stroke.

At the instant at which any particular rolled blank is transferred from the winding cylinder to the expanding horn, the latter is in the collapsed condition shown in Fig. 20, while the folded edges of the blanks are separated a short distance, as shown in Fig. 18, and lie adjacent the inner faces of a pair of engaging wings 85—85$^a$, which at that instant are spread apart and occupy the position shown in Fig. 21. In the sequence of operations of the seam closing mechanism, the wings are first folded to the position shown in Fig. 20 to bring the folded edge of the blank into overlapping position, and the expander segments and wings move apart under the action of the cams M and T to interlock the edges, after which a pressure bar or hammer 86 is forced upwardly against an anvil 86$^a$ carried by the horn section 76 to close the seam, the wings continuing to spread to clear the completely formed can body. As the hammer descends, the segments 77 are again shifted inwardly by the springs 77$^a$, and the upper feeder bars then strip the can body from the horn and discharge it from the machine.

The wings 85 and 85$^a$ are pivoted upon pivot bolts 87—87 carried by a lower rear portion 88$^c$ of the adjustable bracket 88, and are formed with arms marked respectively 89 and 89$^a$. These arms are severally connected by links 90 and 90$^a$ with a rocking lever 91 pivoted upon a stud 91$^a$ mounted in said bracket 88, the outer end of said lever being pivoted to a connecting head 92 which by a vertical actuating rod 92$^a$ is adjustably secured to a cam yoke 92$^b$ arranged to straddle the main cam shaft X and equipped with a roller engaging a side groove formed in a cam disk T fast upon said cam shaft.

It should be noted that the pivotal connections of the two links 90 and 90$^a$ at different points on the rocking lever 91 cause the wing 85$^a$ to move more rapidly at the beginning of the closing movement than the wing 85, but as the lever 91 moves downward the toggle connection between the pivot at the upper end of the arm 89$^a$ and the fulcrum on the stud 91$^a$ approaches a dead center and the wing 85$^a$ becomes almost stationary, while the toggle connection of the wing 85 causes it to close in less rapidity at the beginning of the stroke and to close in after the wing 85$^a$ has become practically stationary. This difference in the closing movement of the two wings, together with a slightly less curvature of the end of the wing 85, enables the inwardly bent edge of the blank to pass below the outwardly bent opposite edge, into position to make interlocked engagement therewith, as shown in Fig. 20.

Above the central portion 76 of the horn and between the guide bars 83, seated in a recess formed in the portion 88$^c$ of the bracket member 88 to receive it and the guide bars, is arranged a backing plate 93 which is formed with an upwardly extending portion 93$^a$ which bears against the flat face of a rod 93$^b$ seated in a cylindrical bore in said bracket member,—see Figs. 13 and 21. This backing plate is provided as a means for sustaining the stress of the hammer 86 against the horn member 76 during the closing of the seam, since the horn member is connected to the frame only through the tubular core 61 at the front end of such core, and this support is incapable of withstanding a considerable degree of pressure.

Figure 4:
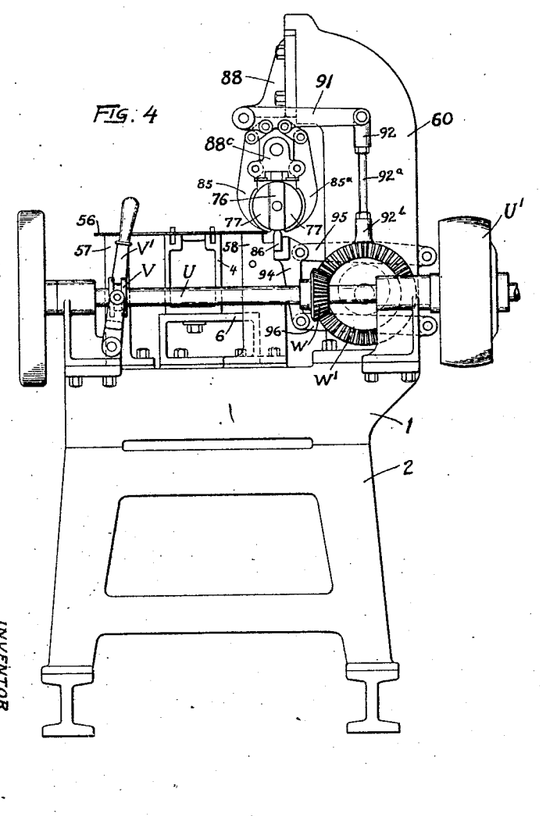
Fig. 4 is an elevation of the delivery or rear end of the machine, various parts near the center or front being omitted.

The pressure bar 86 is secured to a plate or block 94 pivoted to the inner ends of a pair of horizontal parallel arms 95 and 96 which are pivoted at their outer ends in bearing hubs formed on the outer face of the frame bracket 60 (see Figs. 4 and 21). The arm 95 is equipped between its ends with a pair of cam rollers 95$^a$ arranged on its opposite sides, and the arm 96 is similarly equipped with a pair of rollers 96$^a$. These rollers are arranged to cooperate with a double eccentric 97 (see Fig. 3), secured to the cam shaft X.

*Adjustments for varying size of can bodies.*—Both the lower and upper feed bars, it may first be noted, have a stroke of invariable length and the distance between the feed dogs and dimensions of the various mechanisms longitudinally of the machine determines the maximum height or axial length of any can body within the capacity of the machine to make. If desired, the lower feeder bars may be left permanently set in such position that the feed dogs will bring up the foremost edge of the blank (the rear edge with reference to movement of the blanks through the machine) to the front edge of the various work stations, whatever the width of the blank may be, or the blanks may be centered at the different work stations by loosening the clamp nuts which secure the hub of the rock arm D to the shaft C and by longitudinal adjustment of the feeder bars and angular adjustment of the rock to set the feed dogs to center the blanks at the successive work stations. In either case the posts of the magazine will, of course, be set to properly center and position the blanks to be engaged by the front pair of feed dogs.

To provide for setting the machine to make can bodies of different diameters, it is obvious that interchangeable cylinder and horn members of different sizes must be provided. It is also obvious as the left side cover-clipping and edge-bending and guide members deliver blanks of whatever size with the upwardly bent edges lying centrally over the lower guide roll 72, no adjustment of such roll is necessary. By a proper adjustment of the arm 62 a cylinder and horn unit of any selected size may be set so that the hook bar of the cylinder will properly engage the upwardly bent hook of a blank beneath it while by adjustment of the bracket 88 the upper guide roller and feed bars and folding wings carried by it may be set together at the proper height to cooperate with the cylinder and horn members.

It may here be noted that the setting of the lower side of the winding cylinder and closure horn and parts cooperating therewith at a fixed level provided for by the adjustment of the cylinder and horn support results in the formed can bodies being delivered with the seam line at the same level, whatever the size of the bodies may be. This feature is of marked advantage in the production of soldered can bodies since the straight line delivery of the seams dispenses with the necessity of any adjustment of parts of the soldering mechanism, such as the flux pot, the solder roll, the wiping roll, the cooling device, etc., which in all previous can body making machines known to me have required vertical adjustment to accommodate them to the different levels of the seam line in different sized can bodies.

From the description of the construction of the machine earlier above given it will have been noted that the left side portions of the corner-clipping mechanism and edge-bending mechanisms are mounted in stationary position, while the feed bar support 4, carrying both the feed bars and vacuum cup, is laterally adjustable as one unit, and the right side parts of the corner-clipping and edge-bending mechanism, with associated guide members, are carried by the bracket 28 and are similarly adjustable as a second unit.

Figure 5:
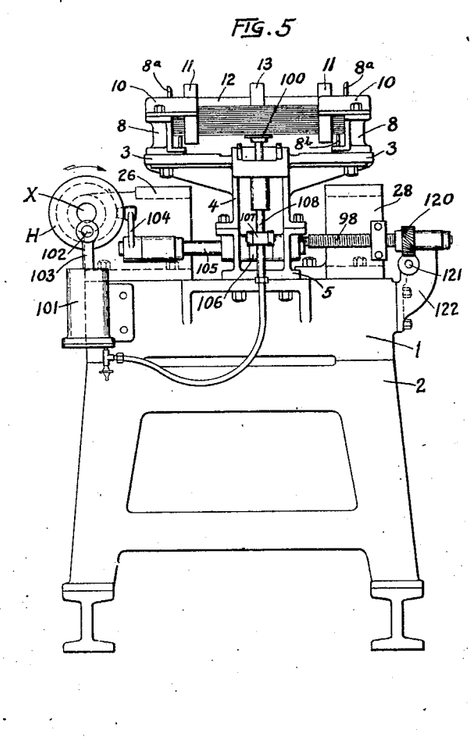
Fig. 5 is an elevation of the front end of the machine, various parts towards the rear being omitted.
Figure 6:
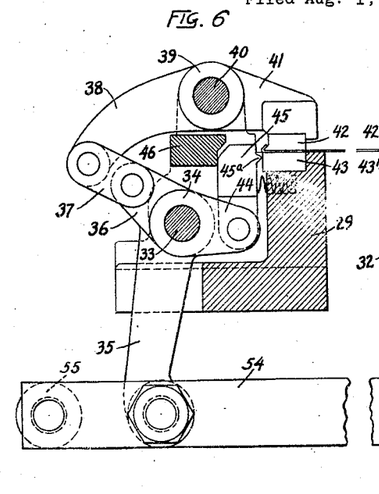
Figs. 6 and 7 are sections on the dotted line 6—7 of Fig. 3 showing on an enlarged scale details of construction of the edge-bending mechanism.
Figure 7:
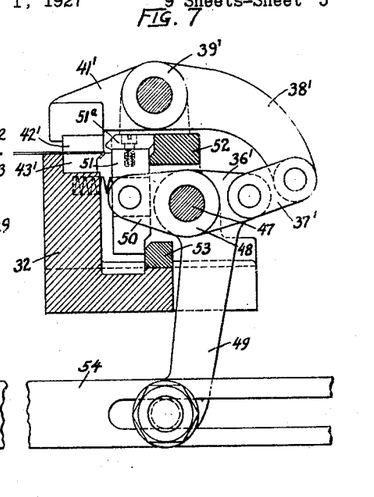

For the purpose of adjusting the last-mentioned unit transversely of the machine, to adapt the mechanism carried by it to operate upon blanks of various widths between their folding edges, and at the same time automatically shifting the first-mentioned unit in the same direction, but only half the distance, to maintain the central position of the vacuum cup and feed bars, I have provided a differential screw mechanism consisting of two similar screw members arranged transversely of the machine, the front screw member 98, being shown in Fig. 5 and the rear one 99 in Fig. 12. These screws are each formed with an inner threaded portion engaging a threaded block secured to the under side of the feed bar support, and an outer threaded portion engaging threaded seats in the bracket 28, the pitch of the threads of the two portions being such as to produce an adjusting movement of said bracket twice that of the movement of the feed bar support.

The differential screws are simultaneously rotated by helical gears 120 secured to their outer ends and arranged to cooperate with a pair of matching spiral pinions secured to a longitudinally disposed shaft 121 which is rotatably mounted in bearing brackets 122 secured to the right side of the bed plate 1 of the machine and is arranged to be engaged by an operating handle for turning it. It will be understood that for the purpose of rigidity and security of adjustment bolts are provided for clamping the various adjustable units rigidly to the stationary parts of the machine in any selected position of adjustment, and proper adjustment of certain of the operating connections may be made as necessary by means hereinbefore described.

Power may be transmitted to the cam shaft in any suitable manner, the particular means shown including a hollow transmission shaft U, which is secured to a driven pulley U′ of well-known construction equipped with an expansion clutch which is operated by a clutch rod arranged inside the shaft U and connected to an operating collar V which is shifted by a hand lever V′. To the shaft U is secured a bevel pinion W geared to a bevel gear W′ bolted to the hereinbefore mentioned cam T upon the cam shaft X of the machine,— (see Figs. 3 and 4).

I claim:

1. In a machine for forming sheet metal cylinders from blanks having parallel edges, means for bending said edges at acute angles in opposite directions, means for feeding said bent blanks longitudinally of their bent edges, a cylinder having on its periphery a longitudinal undercut engaging edge arranged to hook within one of said bent edges of the blank and wind the blank into substantially cylindrical form, and means for closing the bent edges of the blank to form a seam.

2. In a machine having means for intermittently feeding blanks having each an edge bent at an acute angle, an intermittently rotatable, winding cylinder having on its periphery a longitudinal undercut engaging edge, said cylinder being formed with a cylindrical face extending partway around from said edge and an involute surface continuous with said cylindrical surface curving inwardly to the base of the undercut, and said feeding means being arranged to feed the blanks during intervals of rest of the winding cylinder longitudinally of their bent edges into a position adjacent the involute surface of the cylinder and in the path of said undercut engaging edge thereof, and means for intermittently rotating said cylinder to wind the successive blanks into substantially cylindrical form.

3. In a machine of the character described, a winding cylinder having on its periphery a longitudinal undercut engaging edge, said cylinder being formed with a cylindrical surface extending partway around from said edge and an involute surface continuous with said cylindrical surface curving inwardly to the base of the undercut, said cylindrical surface extending through an angle of more than 180°, and a pair of diametrically-arranged guide rollers adjacent the surface of the said cylinder and parallel therewith.

4. In a machine of the character described, a winding cylinder having on its periphery a longitudinal undercut engaging edge, said cylinder being formed with a cylindrical surface extending partway around from said edge and an involute surface continuous with said cylindrical surface curving inwardly to the base of the undercut, and a plurality of guide members adjacent the face of said cylinder and parallel therewith, the angular distance between said guide members being less than the arc of the cylindrical surface of the cylinder.

5. In a machine of the character described, a winding cylinder having on its periphery a longitudinal undercut engaging edge, said cylinder being formed with a cylindrical face extending partway around from said edge and an involute surface continuous with said cylindrical surface curving inwardly to the base of the undercut, means for rotating said cylinder intermittently, and an intermittently operated follower bar arranged to follow said involute surface during the rotation of the cylinder.

6. In a machine of the character described, mechanism for rolling blanks having parallel edges bent at acute angles in opposite directions including an intermittently rotated winding cylinder having on its periphery an undercut engaging edge, guide members adjacent the surface of said cylinder and parallel therewith, and means for successively feeding the bent blanks longitudinally of the winding cylinder during periods of rest of said cylinder into engaging position with one bent edge of the blank directed inwardly in the path of said undercut engaging edge of the cylinder.

7. In a machine of the character described, mechanism for rolling blanks having parallel edges bent at acute angles in opposite directions including an intermittently rotated winding cylinder having on its periphery an undercut engaging edge, said cylinder being formed with a cylindrical surface extending through an angle of more than 180° from the edge of the blade and an involute surface continuous with said cylindrical surface curving inwardly to the base of the undercut, diametrically arranged upper and lower guide rollers adjacent the surface of the cylinder and parallel therewith, an intermittently-operated follower bar adjacent said lower guide roller arranged to follow said involute surface during the rotation of the cylinder, and means for successively feeding the bent blanks longitudinally of the winding cylinder during periods of rest of said cylinder into engaging position with one bent edge of the blank directed inwardly in the path of said undercut engaging edge of the cylinder.

8. In a machine of the character described, mechanism for rolling blanks having parallel edges bent at acute angles in opposite directions including an intermittently rotated winding cylinder having on its periphery an undercut engaging edge, said cylinder being formed with a cylindrical surface extending part way around from the edge of said blade and an involute surface continuous with said cylindrical surface curving inwardly to the base of the undercut, guide members adjacent the surface of said cylinder and parallel therewith, an intermittently-operated follower bar arranged to follow said involute surface during the rotation of the cylinder, and means for successively feeding the bent blanks longitudinally of the winding cylinder during periods of rest of said cylinder into engaging position with one bent edge of the blank directed inwardly in the path of said undercut engaging edge of the cylinder.

9. In a machine of the character described, means for successively feeding blanks having parallel edges bent at acute angles in opposite directions, an intermittently rotated winding cylinder having on its periphery an undercut engaging blade arranged to engage one bent edge of a blank fed to it and wind said blank into approximately cylindrical form, an expanding horn in alignment with said cylinder having a stationary central portion and intermittently movable side sections, means for successively transferring the wound blanks from said cylinder to said horn while said side portions are collapsed, means for expanding said side sections to interlock the bent edge of the blank, and pressure means for closing the seam.

10. Mechanism according to claim 9 in which said cylinder is mounted to rotate on a core which is stationarily secured at one end to the machine frame and which at the other end is fixed to the central portion of the horn.

11. Mechanism according to claim 9 in which said cylinder is mounted to rotate on a tubular core which is fixed at one end to the machine frame and which at the other end is fixed to the central portion of the horn, and in which a rock rod extending through said tubular core and into said central horn member is arranged to expand said movable side sections.

12. In a machine of the character described, means for successively feeding blanks having parallel edges bent at acute angles in opposite directions, a cylinder and expanding horn supporting member having a bearing core which at one end is stationarily fixed to the machine frame and at the other end is continuous with a central portion of the horn, an intermittently rotating winding cylinder on said core having on its periphery an undercut engaging blade arranged to engage one bent edge of a blank and wind it into approximately cylindrical form, movable side horn sections slidingly mounted for expansion on said central horn portion, feed means for transferring blanks rolled on said cylinder to said expanding horn, a pressure bar for closing the seam arranged to cooperate with said central horn portion, and a backing member carried by the machine frame and arranged diametrically opposite to said pressure bar.

13. In a machine of the character described having means for successively feeding blanks having parallel edges bent at acute angles in opposite directions and having an intermittently rotated winding cylinder arranged to engage one bent edge of a bank and wind it into approximately cylindrical form and also having feed bars for transferring the wound blanks, a seam closing mechanism including an expanding horn having a stationarily supported central portion and inwardly spring-pressed side sections slidingly mounted for expanding movement on said central portion, oscillating wings arranged to fold the bent end portions of the blank inwardly to interlocked position while said side sections are in inner position, means for simultaneously moving said side sections and said wings to outer position, and a pressure bar arranged to close the seam while said side sections and wings are in outer position.

14. In a machine of the character described, a mechanism for bending sheet metal blanks including anvil bars having opposite outwardly directed bending edges, means for feeding the blanks in succession to and past said anvil bars, means for clamping said blanks including clamping members arranged to cooperate with said anvil bars and arranged to clamp the blanks with their opposite edges extending over said bending edges of the anvil bars, opposite bending tools arranged to cooperate with said anvil bars, and a T-shaped rocking lever having oppositely extending arms to which the movable clamping member and bending tool of at least one of said mechanisms are severally connected, the bending tool on one side being arranged to move upwardly to make an upward bend at the adjacent edge of the blank and the bending tool on the other side being arranged to move downwardly to make a downward bend at the other edge of the blank.

15. In a machine of the character described, a mechanism for bending sheet metal blanks including anvil bars having opposite outwardly directed bending edges, means for feeding the blanks in succession to and past said anvil bars, means for clamping said blanks including clamping members arranged to cooperate with said anvil bars and arranged to clamp the blanks with their opposite edges extending over said bending edges of the anvil bars, opposite bending tools arranged to cooperate with said anvil bars, at least one of said tools being a flat bar formed with an angular bending rib on its inner face and with cam faces near its opposite edges on its outer face, said bar being equipped with sliding blocks adjacent its opposite ends, and a rocking actuating lever pivotally connected to said sliding blocks, the bending tool on one side being arranged to move upwardly to make an upward bend at the adjacent edge of the blank and the bending tool on the other side being arranged to move downwardly to make a downward bend at the other edge of the blank.

16. In a machine of the character described, a corner clipping device including, in combination with a shear block, an oscillating shaft, a sleeve secured to said shaft having a threaded neck and formed with a conical clamping seat, a clamping nut engaging said threaded neck, and a cutter formed with a complementary conical clamping face and an outwardly extending cutting face.

17. A corner clipping device according to claim 14 in which said shaft is formed with a pair of longitudinal flat faces and said sleeve is equipped with a pair of locking screws arranged to severally cooperate with said flat faces of the shaft.

18. In a machine of the character described, a corner clipping device including, in combination with a shear block, an oscillating shaft, a sleeve secured to said shaft having a threaded neck and formed with a conical clamping seat, a clamping nut engaging said threaded neck, and a cutter formed with a side opening at least as wide as the diameter of said threaded neck and also formed with a conical clamping face and an outwardly extending cutting face.

19. In a machine of the character described, means for intermittently feeding sheet metal blanks longitudinally of the machine from front to rear, a pair of edge-bending mechanisms at opposite sides of the machine for bending opposite edges of a blank at acute angles in opposite directions at one work station, a winding cylinder at one side of the machine at a succeeding work station arranged with its axis parallel with the folded edge of the blank adjacent it, said cylinder having on its periphery a longitudinal undercut engaging edge arranged to hook within said folded edge of the blank and wind the blank into substantially cylindrical form, and means for closing the bent edges of the rolled blank to form a seam.

20. In a machine of the character described, means for intermittently feeding sheet metal blanks in a horizontal plane longitudinally of the machine from front to rear, a pair of edge-bending mechanisms at opposite sides of the machine for bending opposite edges of a blank in opposite directions at one work station, a rotatable cylinder support and removable winding cylinder thereon at one side of the machine at a succeeding work station arranged with the axis of the cylinder parallel with the folded edge of the blank adjacent it, said cylinder being provided with means for engaging said folded edge of the blank, means for adjusting the position of said cylinder support vertically, and means for closing the bent edges of the rolled blank to form a seam.

21. In a machine of the character described, a feed bar support extending longitudinally of the machine, feed bars mounted in said support, a pair of edge-bending mechanisms at opposite sides of the machine, one of said mechanisms being mounted in stationary position and the other being movable transversely of the machine, and adjusting mechanism connected to said feed bar support and also to said movable edge-bending mechanism and arranged to shift the latter twice the distance of the former transversely of the machine.

22. In a machine of the character described, a feed bar support extending longitudinally of the machine, feed bars mounted in said support, a pair of edge-bending mechanisms at opposite sides of the machine, one of said mechanisms being mounted in stationary position and the other being movable transversely of the machine, a vertically adjustable cylinder support and removable winding cylinder thereon mounted in longitudinal alignment with the stationarily-mounted edge-bending mechanisms, and adjusting mechanism connected to said feed bar support and also to said movable edge-bending mechanism and arranged to shift the latter twice the distance of the former transversely of the machine.

23. A machine for making can bodies including means for feeding in a horizontal plane blanks having oppositely bent edges, a pivotal support and a removable winding cylinder in said support arranged with the axis of the cylinder disposed vertically above one bent edge of the blank, said cylinder being arranged to engage said bent edge of the blank and roll the blank into substantially cylindrical form with meeting bent edges in the plane of the fed blanks, means for adjusting said support vertically whereby cylinders of various sizes may be mounted in said support in working relation to the fed blanks, means for intermittently feeding the rolled blanks to and beyond a seam closing mechanism, and a seam-closing mechanism mounted in fixed position in alignment with said cylinder and having pressure members arranged to close the bent edges of the rolled blank to form a seam.

24. In a machine of the character described, a feed magazine, feeding mechanism arranged to intermittently feed blanks from said magazine to successive work stations, a pair of corner clipping mechanisms arranged on opposite sides of said feed bars at one work station, a pair of edge-bending devices on opposite sides of said feed bars at a succeeding station, a rolling cylinder at a succeeding station arranged to engage the bent edge at one side of a blank and bend the blank to approximately cylindrical form, seam-closing mechanism for closing the bend edges of the blank to form a seam, and supplementary feeding mechanism for feeding the rolled blanks from the rolling cylinder to the seam-closing mechanism.

In testimony whereof, I have subscribed my name.

MARTIN AUGUST SEAHOLM.